US011190789B2

(12) United States Patent
Li et al.

(10) Patent No.: US 11,190,789 B2
(45) Date of Patent: Nov. 30, 2021

(54) METHOD AND APPARATUS FOR VIDEO CODING USING INTER-PREDICTION MODE SIGNALING TO DERTERMINE MOTION VECTORS

(71) Applicant: TENCENT AMERICA LLC, Palo Alto, CA (US)

(72) Inventors: Guichun Li, Milpitas, CA (US); Xiang Li, Saratoga, CA (US); Xiaozhong Xu, State College, PA (US); Shan Liu, San Jose, CA (US)

(73) Assignee: TENCENT AMERICA LLC, Palo Alto, CA (US)

(*) Notice: Subject to any disclaimer, the term of this patent is extended or adjusted under 35 U.S.C. 154(b) by 0 days.

(21) Appl. No.: 16/910,836

(22) Filed: Jun. 24, 2020

(65) Prior Publication Data

US 2020/0413078 A1    Dec. 31, 2020

Related U.S. Application Data

(60) Provisional application No. 62/869,012, filed on Jun. 30, 2019.

(51) Int. Cl.
*H04N 19/44* (2014.01)
*H04N 19/137* (2014.01)
(Continued)

(52) U.S. Cl.
CPC ........... *H04N 19/44* (2014.11); *H04N 19/105* (2014.11); *H04N 19/109* (2014.11);
(Continued)

(58) Field of Classification Search
CPC ...... H04N 19/44; H04N 19/137; H04N 19/46; H04N 19/176; H04N 19/105;
(Continued)

(56) References Cited

U.S. PATENT DOCUMENTS

2013/0003849 A1* 1/2013 Chien ................ H04N 19/52
375/240.16
2019/0132606 A1* 5/2019 Su .......................... H04N 19/53
(Continued)

OTHER PUBLICATIONS

Joint Collaborative Team on Video Coding (JCT-VC) of ITU-T SG 16 WP 3 and ISO/IEC JTC 1/SC 29/WG 11 16th Meeting: San Jose, US, Jan. 9-17, 2014, Document: JCTVC-P0277 (Year: 2014).*
(Continued)

*Primary Examiner* — Marnie A Matt
(74) *Attorney, Agent, or Firm* — Oblon, McClelland, Maier & Neustadt, L.L.P.

(57) ABSTRACT

An apparatus for video decoding includes receiving circuitry and processing circuitry. In some embodiments, the processing circuitry decodes prediction information of a current block in a current picture from a coded video bitstream. The prediction information is indicative of an inter prediction mode that signals a value associated with a motion vector difference in the coded video bitstream. The processing circuitry determines a precision for the motion vector difference based on a size of the current block, and converts the signaled value in the coded video bitstream to the motion vector difference based on the determined precision. Then, the processing circuitry determines a motion vector based on a prediction of the motion vector and the motion vector difference, and reconstructs at least a sample of the current block according to the motion vector.

17 Claims, 15 Drawing Sheets

(51) Int. Cl.
*H04N 19/46* (2014.01)
*H04N 19/176* (2014.01)
*H04N 19/105* (2014.01)
*H04N 19/159* (2014.01)
*H04N 19/186* (2014.01)
*H04N 19/132* (2014.01)
*H04N 19/513* (2014.01)
*H04N 19/51* (2014.01)
*H04N 19/109* (2014.01)
*H04N 19/91* (2014.01)
*H04N 19/54* (2014.01)
*H04N 19/52* (2014.01)

(52) U.S. Cl.
CPC ......... *H04N 19/132* (2014.11); *H04N 19/137* (2014.11); *H04N 19/159* (2014.11); *H04N 19/176* (2014.11); *H04N 19/186* (2014.11); *H04N 19/46* (2014.11); *H04N 19/51* (2014.11); *H04N 19/513* (2014.11); *H04N 19/52* (2014.11); *H04N 19/54* (2014.11); *H04N 19/91* (2014.11)

(58) Field of Classification Search
CPC .. H04N 19/159; H04N 19/186; H04N 19/132; H04N 19/54; H04N 19/52; H04N 19/70; H04N 19/91; H04N 19/523
USPC .................................................... 375/240.25
See application file for complete search history.

(56) References Cited

U.S. PATENT DOCUMENTS

| | | | |
|---|---|---|---|
| 2019/0320195 A1* | 10/2019 | Lim | H04N 19/52 |
| 2020/0128250 A1* | 4/2020 | Lee | H04N 19/105 |
| 2020/0252644 A1* | 8/2020 | Lee | H04N 19/52 |
| 2020/0280732 A1* | 9/2020 | Liu | H04N 19/91 |
| 2021/0105481 A1* | 4/2021 | Kim | H04N 19/176 |
| 2021/0120261 A1* | 4/2021 | Lim | H04N 19/91 |

OTHER PUBLICATIONS

ITU-T Telecommunication Standardization Section of ITU, "High efficiency video coding", H.265, Series H: Audiovisual and Multimedia Systems Infrastructure of audiovisual series—Coding of moving video, International Telecommunication Union, Dec. 2016 (664 pages).

Benjamin Brass et al., "Versatile Video Coding (Draft 3)", Joint Video Experts Team (JVET) of ITU-T SG 16 WP 3 and ISO/IEC JTC 1/SC 29/WG11, JVET-N1001-v9, 14th Meeting: Geneva, CH, Mar. 19-27, 2019 (406 pages).

* cited by examiner

METHOD AND APPARATUS FOR VIDEO CODING USING INTER-PREDICTION MODE SIGNALING TO DERTERMINE MOTION VECTORS

INCORPORATION BY REFERENCE

This present disclosure claims the benefit of priority to U.S. Provisional Application No. 62/869,012, "METHODS ON AMVR AND SMVD" filed on Jun. 30, 2019 which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920× 1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes receiving circuitry and processing circuitry. In some embodiments, the processing circuitry decodes prediction information of a current block in a current picture from a coded video bitstream. The prediction information is indicative of an inter prediction mode that signals a value associated with a motion vector difference in the coded video bitstream. The processing circuitry determines a precision for the motion vector difference based on a size of the current block, and converts the signaled value in the coded video bitstream to the motion vector difference based on the determined precision. Then, the processing circuitry determines a motion vector based on a prediction of the motion vector and the motion vector difference, and reconstructs at least a sample of the current block according to the motion vector.

In some embodiments, the processing circuitry decodes at least a flag indicative of the precision for the motion vector difference used in an affine mode according to a context that is selected based on the size of the current block. For example, the processing circuitry selects the context based on a comparison of a number of luma samples in the current block to a first threshold. In another example, the processing circuitry selects the context based on a comparison of a larger value of a width and a height of the current block to a second threshold. In another example, the processing circuitry selects the context based on a comparison of a smaller value of the width and the height of the current block to a third threshold.

In some embodiments, the processing circuitry decodes a flag for indicating whether a specific precision is used based on a context that is shared in an affine mode and a non-affine mode.

In an embodiment, the processing circuitry determines the precision for the motion vector difference based on a predetermined relationship that associates sizes with precisions.

In an embodiment, the processing circuitry decodes a switch bin that indicates the precision for the motion vector difference is a block size dependent precision. In an example, the switch bin is used to switch between the block size dependent precision and a default precision. In another example, the switch bin is used to switch between the block size dependent precision and a selected precision that is selected from a set of fixed precisions based on an index.

In an embodiment, the processing circuitry applies the precision to a first motion vector difference of a first control point in an affine mode and applies a fixed precision to a second motion vector difference of a second control point.

According to another aspect of the disclosure, the processing circuitry decodes prediction information of a current block in a current picture from a coded video bitstream. The prediction information is indicative of a symmetric motion vector difference mode for bi-prediction from a pair of forward and backward reference pictures. The processing circuitry excludes a reference picture from being in the pair of forward and backward reference pictures without a check based on a picture order count (POC) of the reference picture. Further, the processing circuitry determines, a first reference block for the current block in the forward reference picture, and a second reference block for the current block in the backward reference picture, and reconstructs at least a sample of the current block according to the first reference block and the second reference block.

In an embodiment, the processing circuitry skips the reference picture in a searching of the pair of forward and backward reference pictures in response to a detection of a long term reference picture (LTRP) mark associated with the reference picture.

In another embodiment, the processing circuitry assigns, to the reference picture, a calculated picture order count with a default POC distance to the current picture, in response to a detection of a long term reference picture (LTRP) mark associated with the reference picture.

In another embodiment, the processing circuitry skips the reference picture in a searching of the pair of forward and backward reference pictures in response to a detection that the reference picture is associated with a weighted prediction.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 2:
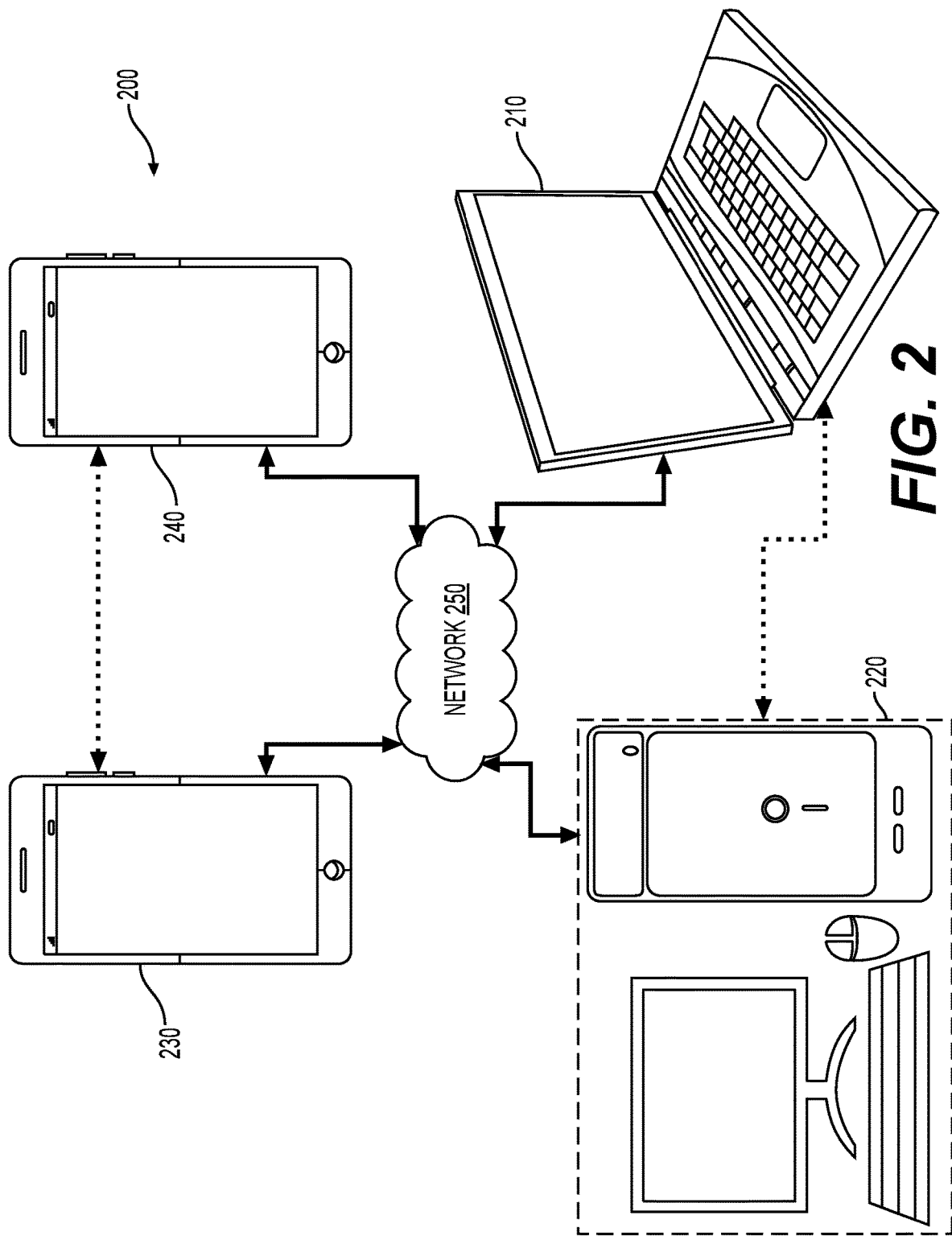
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
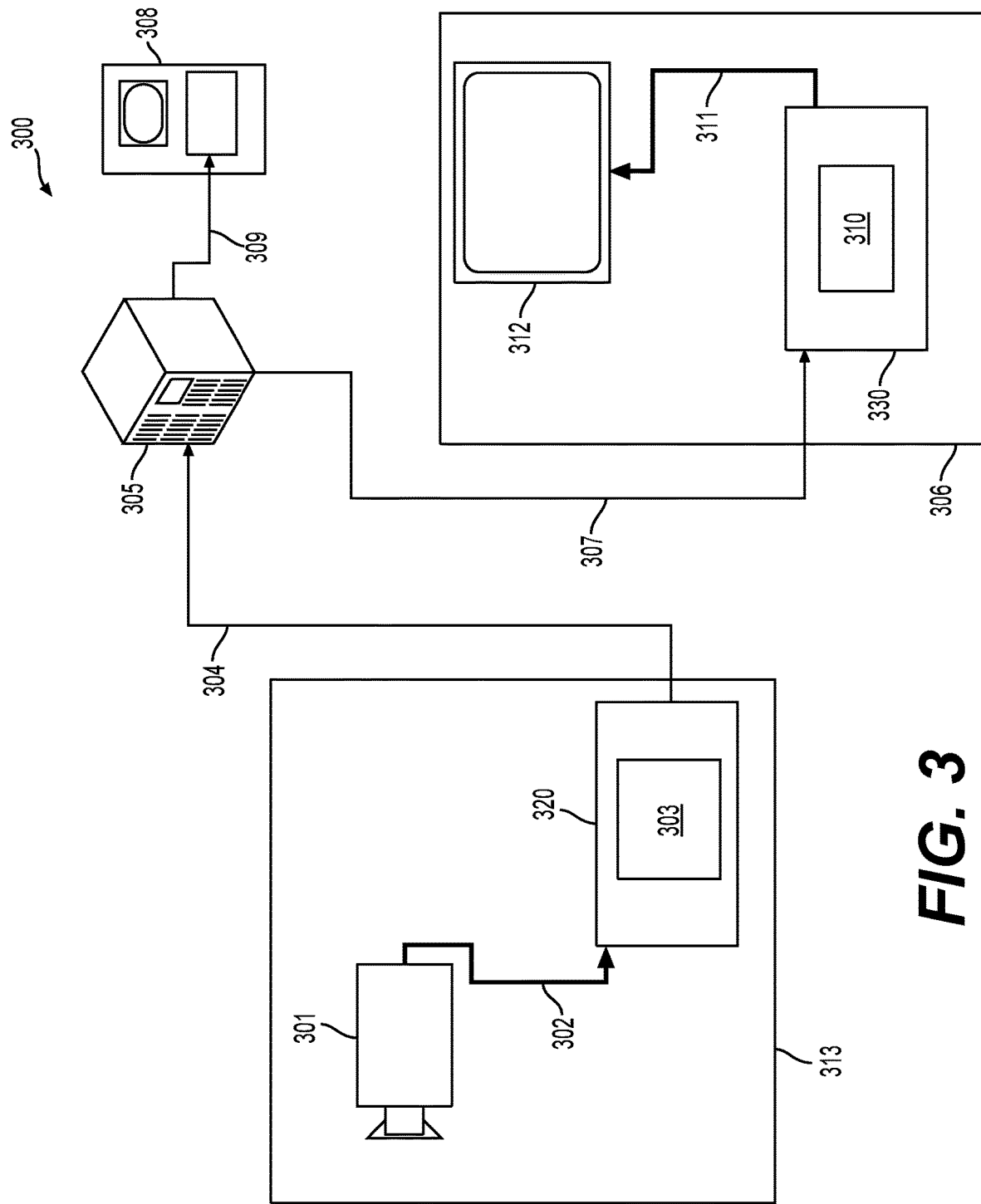
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
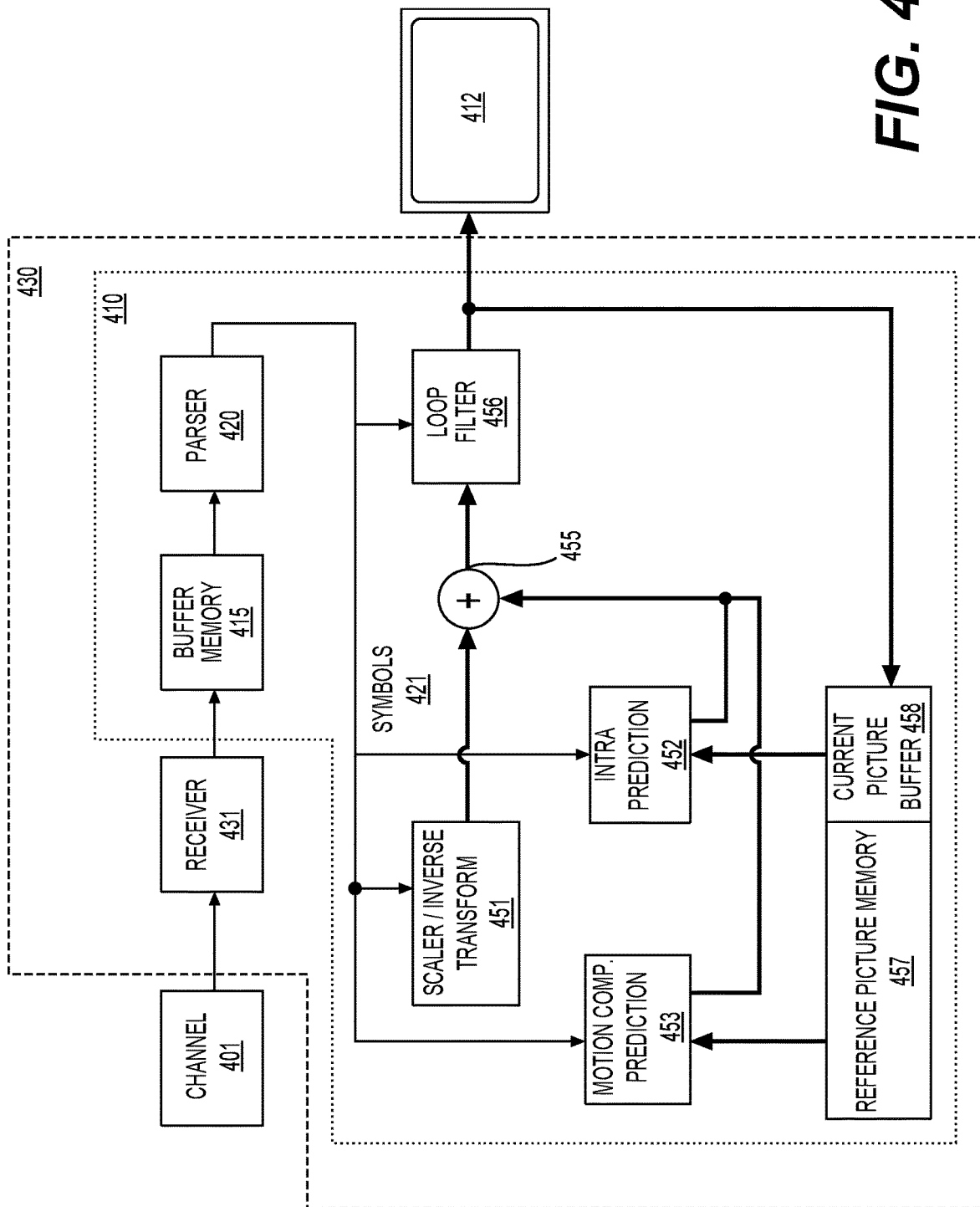
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
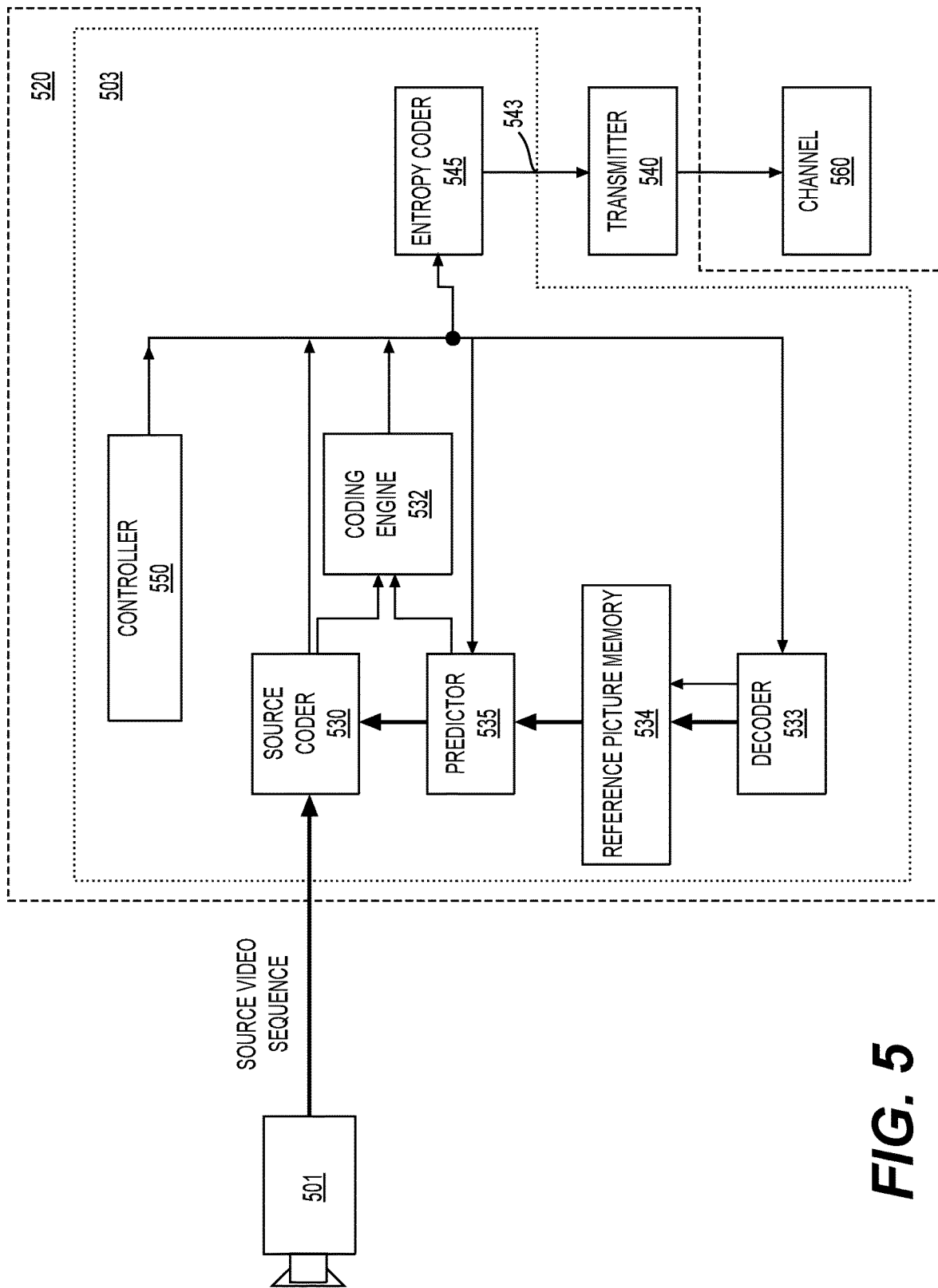
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously coded picture from the video sequence that were designated as "reference pictures." In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
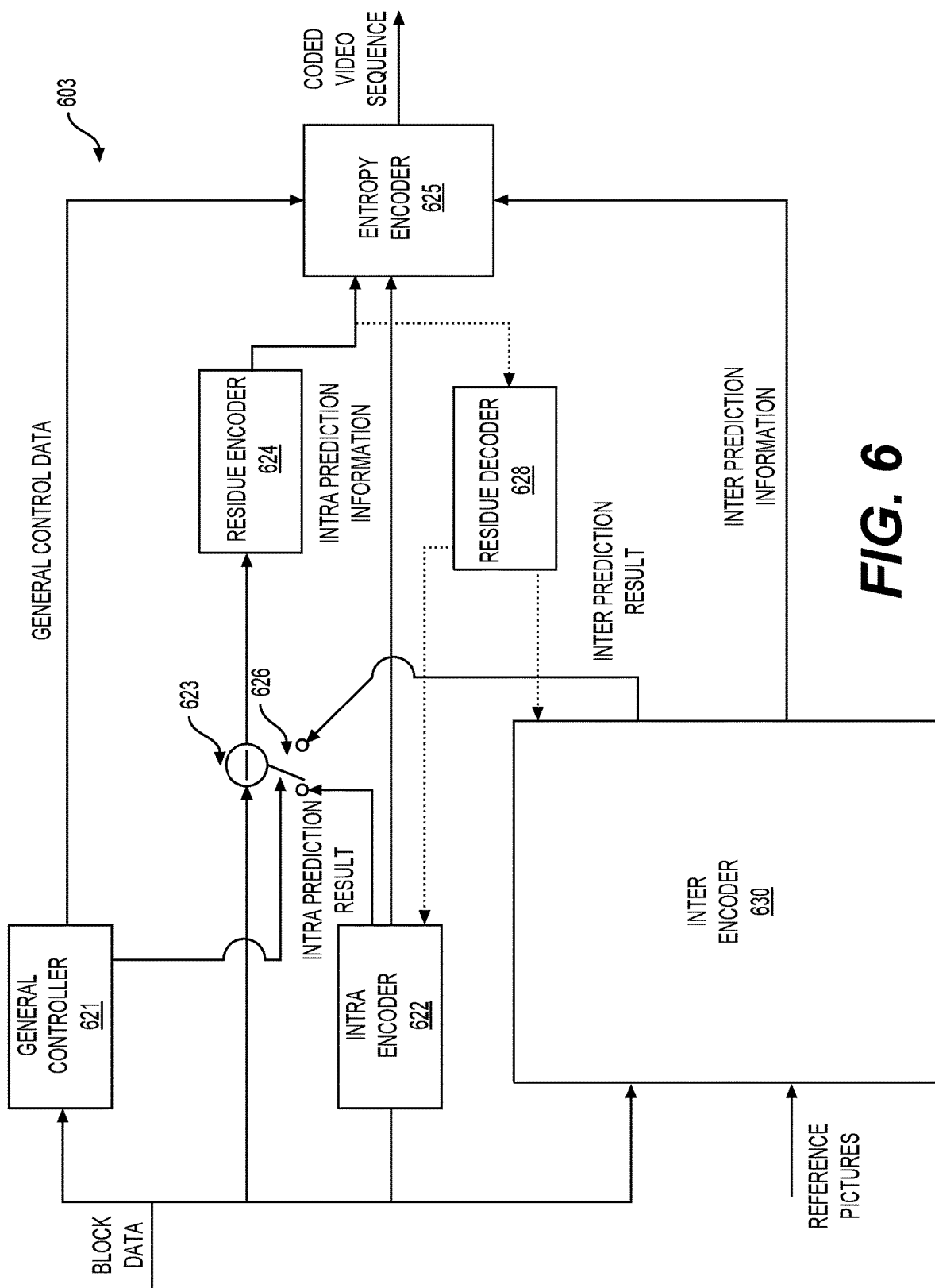
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
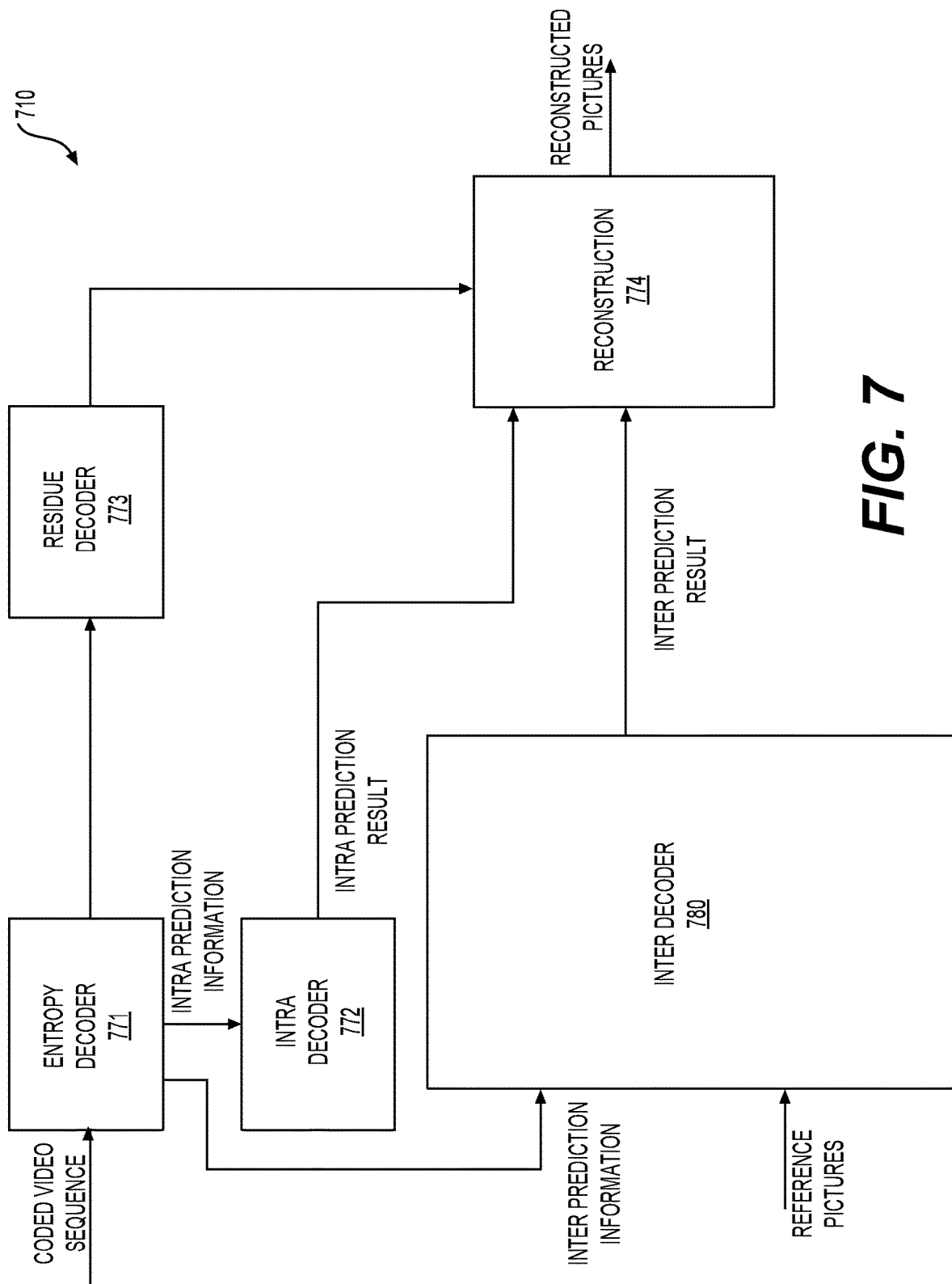
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

Aspects of the disclosure provide techniques for adaptive motion vector resolution (AMVR) on regular inter motion vector difference (MVD) coding, affine MVD coding, and the symmetric MVD (SMVD) coding.

In various embodiments, for an inter-predicted CU, motion parameters including motion vectors, reference picture indices, reference picture list usage index, and/or other additional information can be used for inter-predicted sample generation. Inter prediction can include uni-prediction, bi-prediction, and/or the like. In uni-prediction, a reference picture list (e.g., a first reference picture list or a list 0 (L0) or a second reference picture list or a list 1 (L1)) can be used. In bi-prediction, both L0 and L1 can be used. The reference picture list usage index can indicate that the reference picture list(s) includes L0, L1, or L0 and L1.

The motion parameters can be signaled in an explicit or implicit manner. When a CU is coded with a skip mode, the CU can be associated with one PU and can include no significant residual coefficients (e.g., the residual coefficients are zero), no coded motion vector difference (MVD), or no reference picture index.

A merge mode can be used in which motion parameters for a current CU can be obtained from neighboring CUs, including spatial and temporal merge candidates, and optionally other merge candidates. The merge mode can be applied to an inter-predicted CU, and may be used for a skip mode. Alternatively, motion parameters can be explicit transmitted or signaled. For example, motion vectors, a corresponding reference picture index for each reference picture list, a reference picture list usage flag, and other information can be signaled explicitly per each CU.

In some embodiments, one or more of the following inter prediction coding tools are used: (1) extended merge prediction, (2) merge mode with motion vector difference (MMVD), (3) advanced motion vector prediction (AMVP) mode with symmetric MVD signaling, (4) affine motion compensated prediction, (5) subblock-based temporal motion vector prediction (SbTMVP), (6) adaptive motion vector resolution (AMVR), (7) motion field storage: 1/16th luma sample MV storage and 8×8 motion field compression, (8) bi-prediction with weighted averaging (BWA), (9) bi-directional optical flow (BDOF), (10) decoder side motion vector refinement (DMVR), (11) triangle partition prediction, and (12) combined inter and intra prediction (CIIP).

For affine motion compensated prediction, in HEVC, only translation motion model is applied for motion compensation prediction (MCP). The real world has many kinds of motion, e.g. zoom in/out, rotation, perspective motions and the other irregular motions. In the VTM3, a block-based affine transform motion compensation prediction is applied.

Figure 8B:
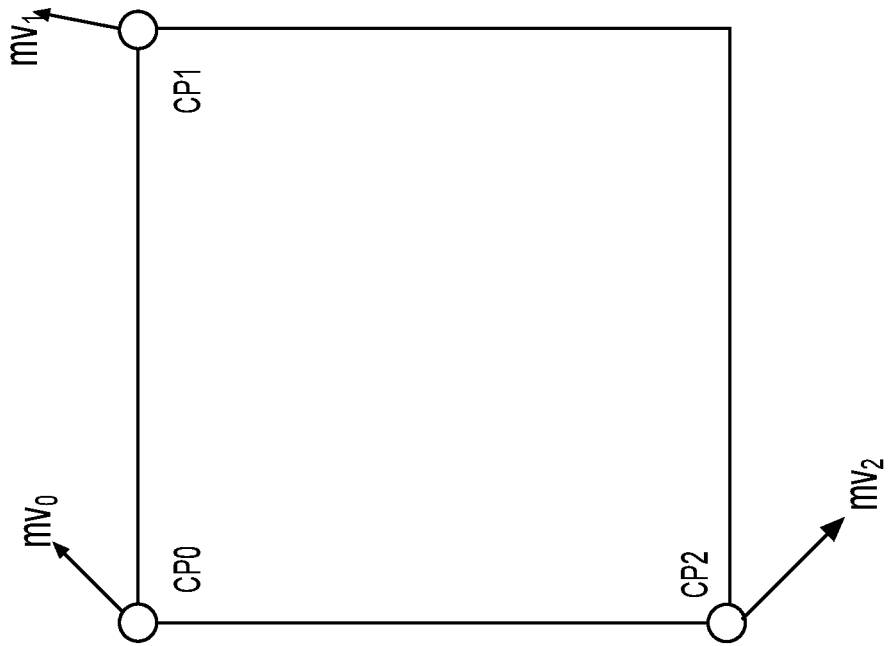
FIGS. 8A-8B show the affine motion fields for 4-parameter affine model and 6-parameter affine model.
Figure 8A:
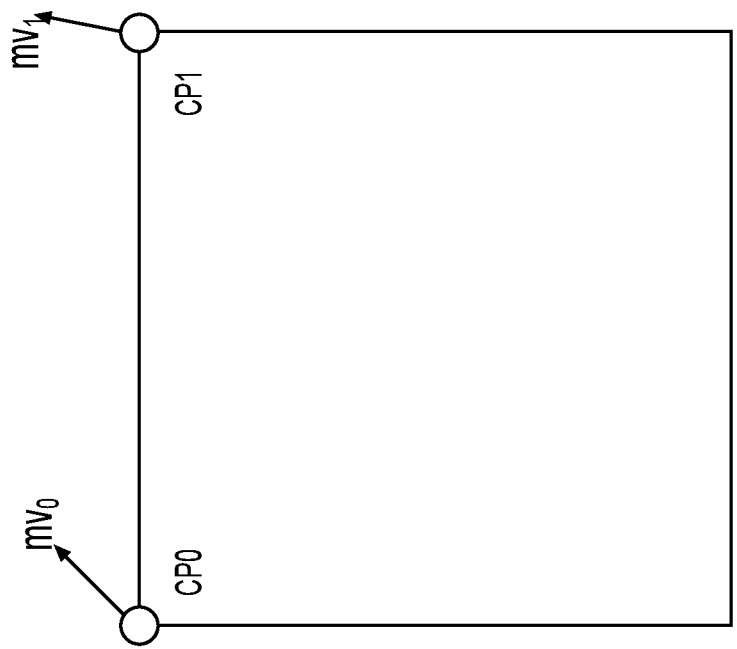

FIG. 8A shows the affine motion field of a block that is described by motion information of two control points (4-parameter affine model) and FIG. 8B shows the affine motion field of a block that is described by three control points (6-parameter affine model).

In some embodiments, the 4-parameter affine motion model, motion vector at sample location (x, y) in a block can be derived as Eq. 1, and the 6-parameter affine motion model, motion vector at sample location (x, y) in a block can be derived as Eq. 2:

$$\begin{cases} mv_x = \dfrac{mv_{1x} - mv_{0x}}{W}x + \dfrac{mv_{1y} - mv_{0y}}{W}y + mv_{0x} \\ mv_y = \dfrac{mv_{1y} - mv_{0y}}{W}x + \dfrac{mv_{1y} - mv_{0x}}{W}y + mv_{0y} \end{cases} \quad \text{(Eq. 1)}$$

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases} \quad \text{(Eq. 2)}$$

where $(mv_{0x}, mv_{0y})$ denotes the motion vector of the top-left corner control point CP0, $(mv_{1x}, mv_{1y})$ is motion vector of the top-right corner control point CP1, and $(mv_{2x}, mv_{2y})$ is motion vector of the bottom-left corner control point CP2.

In order to simplify the motion compensation prediction, block based affine transform prediction is applied.

Figure 9:
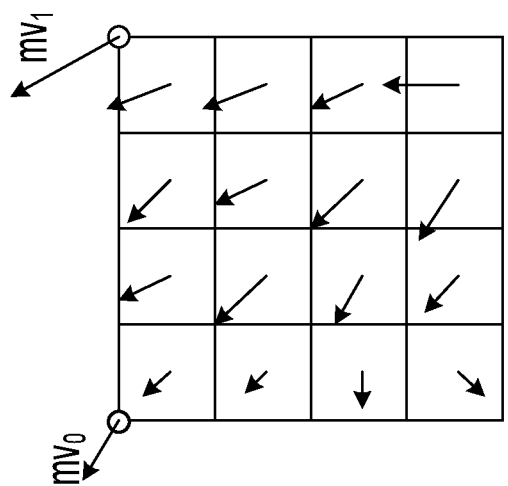
FIG. 9 shows an example of affine motion vector field per sub-block.

FIG. 9 shows an example of affine MV field per sub-block. The current CU is divided into 4×4 luma sub-blocks. To derive motion vector of each 4×4 luma sub-block, the motion vector of the center sample of each sub-block, as shown in FIG. 9, is calculated according to above equations, and rounded to 1/16 fraction accuracy for example. Then the motion compensation interpolation filters are applied to generate the prediction of each sub-block with derived motion vector. The sub-block size of chroma-components is also set to be 4×4. The MV of a 4×4 chroma sub-block is calculated as the average of the MVs of the four corresponding 4×4 luma sub-blocks in an example.

Two affine motion inter prediction modes, such as affine merge (AF_MERGE) mode and affine advanced MVP (affine AMVP) mode, can be used.

For affine merge prediction, in an example, AF_MERGE mode can be applied for CUs with both width and height larger than or equal to 8. In the AF_MERGE mode, the control point motion vectors (CPMVs) of the current CU are generated based on the motion information of the spatial neighboring CUs. In an example, there can be up to five control point motion vector predictor (CPMVP) candidates and an index is signalled to indicate the one to be used for the current CU. In an example, three types of CPMV candidates are used to form the affine merge candidate list. The first type of CPMV candidates is inherited affine merge candidates that extrapolated from the CPMVs of the neighbour CUs. The second type of CPMV candidates are constructed affine merge candidates CPMVPs that are derived using the translational MVs of the neighbour CUs. The third type of CPMV candidates is Zero MVs.

Figure 1:
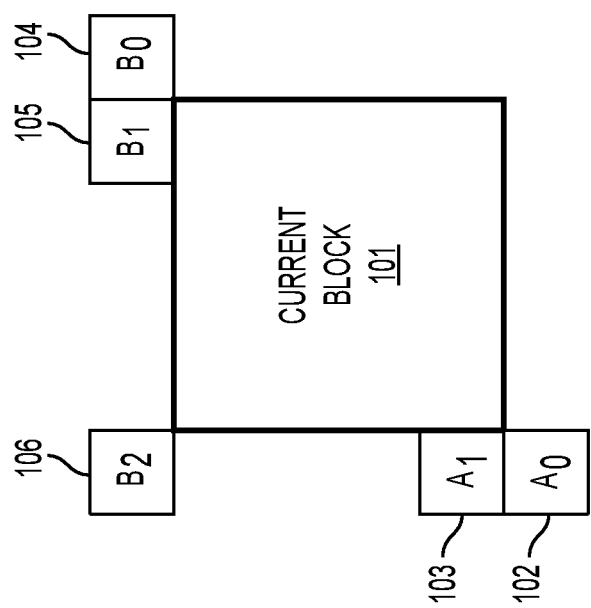
FIG. 1 is a schematic illustration of a current block and its surrounding spatial merge candidates in one example.

In some examples, such as in VTM3, a maximum of two inherited affine candidates can be used. In an example, two inherited affine candidates are derived from affine motion models of the neighboring blocks, one from left neighboring CUs (referred to as left predictor) and one from above neighboring CUs (referred to as above predictor). Using the neighboring blocks shown in FIG. 1 as an example, for the left predictor, the scan order is A0->A1, and for the above predictor, the scan order is B0->B1->B2. In an example, only the first inherited candidate from each side is selected. In some examples, no pruning check is performed between two inherited candidates. When a neighboring affine CU is identified, the control point motion vectors of the neighboring affine CU are used to derive the CPMVP candidate in the affine merge list of the current CU.

Figure 10:
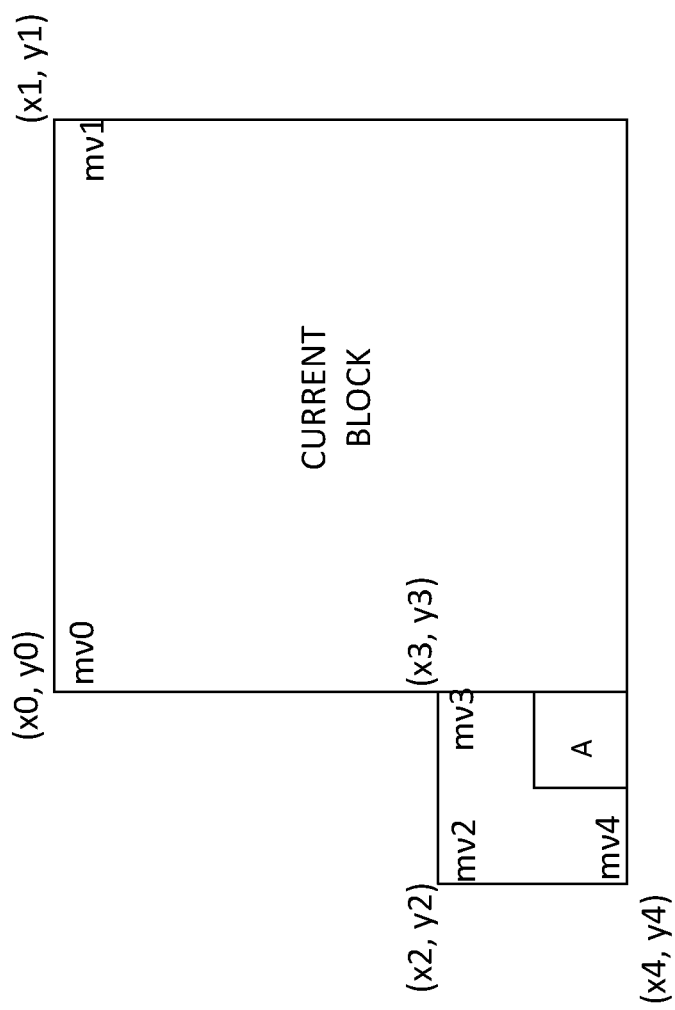
FIG. 10 shows an example for affine merge mode.

FIG. 10 shows an example for affine merge mode. As shown in FIG. 10, when the neighbour left bottom block A is coded in affine mode, the motion vectors $mv_2$, $mv_3$ and $mv_4$ of the top left corner, above right corner and left bottom corner of a CU which contains the block A are attained. When block A is coded with 4-parameter affine model, the two CPMVs of the current CU are calculated according to $mv_2$, and $mv_3$. In case that block A is coded with 6-parameter affine model, the three CPMVs of the current CU are calculated according to $mv_2$, $mv_3$ and $mv_4$.

In some examples, a constructed affine candidate is constructed by combining the neighbor translational motion information of each control point. The motion information for the control points can be derived from the specified spatial neighbors and temporal neighbor.

Figure 11:
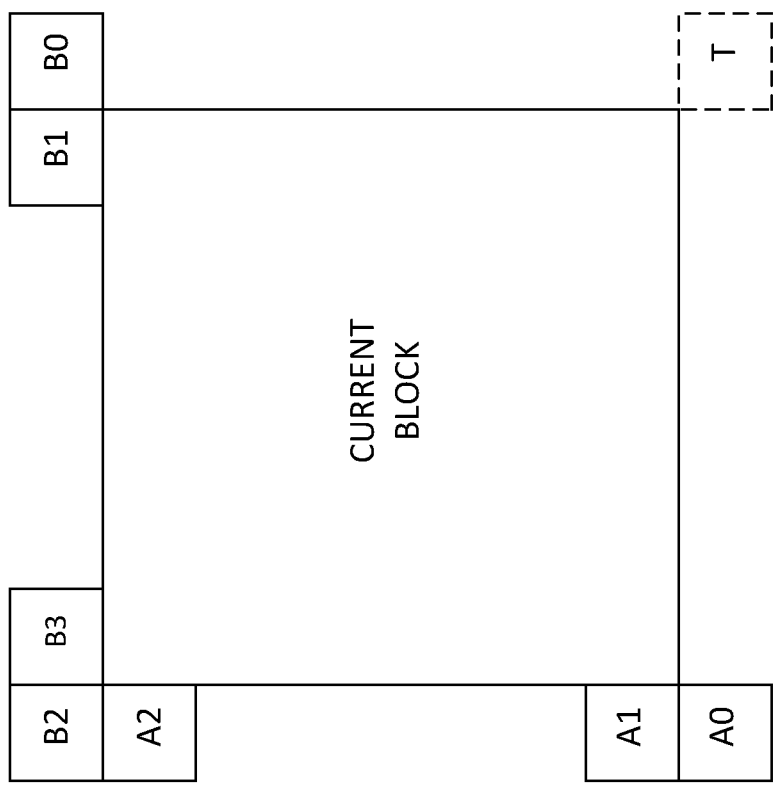
FIG. 11 shows an example of spatial neighbors and temporal neighbor according to some embodiments of the disclosure.

FIG. 11 shows an example of spatial neighbors (e.g., A0-A2 and B0-B3) and temporal neighbor (e.g., T) according to some embodiments of the disclosure. In an example, $CPMV_k$ (k=1, 2, 3, 4) represents the k-th control point. For $CPMV_1$, the B2->B3->A2 blocks are checked (-> is used for checking order) and the MV of the first available block is used. For $CPMV_2$, the B1->B0 blocks are checked and for $CPMV_3$, the A1->A0 blocks are checked. For TMVP, T is checked and is used as $CPMV_4$ if the MV of the block T is available.

After MVs of four control points are attained, affine merge candidates are constructed based on that motion information. The following combinations of control point MVs are used to construct in order: {$CPMV_1$, $CPMV_2$, $CPMV_3$}, {$CPMV_1$, $CPMV_2$, $CPMV_4$}, {$CPMV_1$, $CPMV_3$, $CPMV_4$}, {$CPMV_2$, $CPMV_3$, $CPMV_4$}, {$CPMV_1$, $CPMV_2$}, {$CPMV_1$, $CPMV_3$}.

The combination of 3 CPMVs can construct a 6-parameter affine merge candidate and the combination of 2 CPMVs can construct a 4-parameter affine merge candidate. In an example, to avoid motion scaling process, when the reference indices of control points are different, the related combination of control point MVs can be discarded.

In an example, after inherited affine merge candidates and constructed affine merge candidate are checked, if a candidate list is still not full, zero MVs are inserted to the end of the list.

For affine AMVP prediction, the affine AMVP mode can be applied on CUs with both width and height larger than or equal to 16. In some examples, an affine flag at CU level is signalled in the bitstream (e.g., coded video bitstream) to indicate whether affine AMVP mode is used in the CU and then another flag is signaled to indicate whether 4-parameter affine or 6-parameter affine is used. In the affine AMVP mode, the difference of the CPMVs of current CU and their predictors CPMVPs can be signalled in the bitstream. The affine AMVP candidate list size is 2 and the affine AMVP candidate list is generated by using the following four types of CPVM candidate in the order: (1) inherited affine AMVP candidates that extrapolated from the CPMVs of the neighbour CUs; (2) constructed affine AMVP candidates CPMVPs that are derived using the translational MVs of the neighbour CUs; (3) translational MVs from neighboring CUs; and (4) Zero MVs.

In some examples, the checking order of inherited affine AMVP candidates is the same as the checking order of inherited affine merge candidates. In an example, the only difference between the affine merge prediction and affine AMVP prediction is that, for AVMP candidate, only the affine CU that has the same reference picture as the current block is considered. In an example, no pruning process is applied when inserting an inherited affine motion predictor into the candidate list.

In some examples, constructed AMVP candidate can be derived from the specified spatial neighbors shown in FIG. 11. In an example, the same checking order is used as done in the candidate construction for the affine merge prediction. In addition, reference picture index of the neighboring block is also checked. The first block in the checking order that is inter coded and has the same reference picture as in current CUs is used. When the current CU is coded with 4-parameter affine mode, and motion vectors of two control points $mv_0$ and $mv_1$ are both available, the motion vectors of the two control points are added as one candidate in the affine AMVP list. When the current CU is coded with 6-parameter affine mode, and all three motion vectors of the control points CPMVs are available, they are added as one candidate in the affine AMVP list. Otherwise, constructed AMVP candidate is set as unavailable.

When the number of affine AMVP list candidates is still less than 2 after inherited affine AMVP candidates and constructed AMVP candidate are checked, $mv_0$, $mv_1$ and $mv_2$ will be added, in order, as the translational MVs to predict all control point MVs of the current CU, when available. Finally, zero MVs are used to fill the affine AMVP list if the affine AMVP list is still not full.

According to an aspect of the disclosure, adaptive motion vector resolution (AMVR) can be used in video codec, such as video codec according to VVC and AVS3. In some examples, fixed resolution can be used. For example, in HEVC, motion vector differences (MVDs) (between the motion vector and predicted motion vector of a CU) are signalled in the unit of quarter-luma-sample when use_integer_mv_flag is equal to 0 in the slice header. AMVR allows MVD of the CU to be coded in different resolutions, such as quarter-luma-sample (e.g., ¼ pel), integer-luma-sample (e.g., 1 pel), four-luma-sample (e.g., 4 pel), and the like.

In some embodiments, dependent on the modes (e.g., normal AMVP mode, affine AVMP mode, intra block copy (IBC) AMVP mode) for the current CU, the resolution of the MVDs of the current CU can be adaptively selected according to Table 1:

TABLE 1

Resolutions of motion vector difference

|  | AMVR = 0 | AMVR = 1 | AMVR = 2 |
|---|---|---|---|
| Normal AMVP mode | ¼ pel | 1 pel | 4 pel |
| Affine AMVP mode | ¼ pel | 1/16 pel | 1 pel |
| IBC AMVP mode | — | 1 pel | 4 pel |

In an example, such as in VVC, the CU-level MVD resolution indication is conditionally signalled in coded video bitstream if the current CU has at least one non-zero MVD component. If all MVD components (that includes both horizontal and vertical MVDs for reference list L0 and reference list L1) are zero, quarter-luma-sample MVD resolution is inferred in an example.

In some embodiments, for a CU that has at least one non-zero MVD component, a first flag is signalled to indicate whether quarter-luma-sample MVD precision is used for the CU. If the first flag is 0, no further signaling is needed and quarter-luma-sample MVD precision is used for the current CU. Otherwise, a second flag is signalled to indicate whether integer-luma-sample or four-luma-sample MVD precision is used for normal AMVP CU. The same second flag is used to indicate whether integer-luma-sample or 1/16 luma-sample MVD precision is used for affine AMVP CU. In order to ensure the reconstructed MV has the intended precision (quarter-luma-sample, interger-luma-sample or four-luma-sample), the motion vector predictors for the CU are rounded to the same precision as that of the MVD before being added together with the MVD. The motion vector predictors are rounded toward zero (means that a negative motion vector predictor is rounded toward positive infinity and a positive motion vector predictor is rounded toward negative infinity).

In some implementation examples, at the encoder side, the encoder determines the motion vector resolution for the current CU using rate distortion (RD) check. In some examples, rate distortion check can be performed for different resolutions, such as a precision of a full pixel size sample (also known as "an integer-luma-sample precision"), a precision of a half of a luma sample (also known as "half-luma-sample precision"), a precision of a quarter of a luma sample (also known as "quarter-luman-sample precision"), a precision of four-pixel size sample (also known as "four-luma-sample precision"), etc. To avoid always performing CU-level rate distortion check multiple times for MVD resolutions, in some examples (e.g., VTM4), the rate distortion (RD) check other then quarter-luma-sample MVD resolution is only invoked conditionally. In an example, for normal AVMP mode, the RD cost of quarter-luma-sample MVD precision and integer-luma-sample MVD precision are computed first. Then, the RD cost of integer-luma-sample MVD precision is compared to RD cost of quarter-luma-sample MVD precision to decide whether further RD cost check of four-luma-sample MVD precision is needed. When the RD cost for quarter-luma-sample MVD precision is much smaller than the RD cost of the integer-luma-sample MVD precision, the RD check of four-luma-sample MVD precision can be skipped.

In another example, for affine AMVP mode, if affine inter mode is not selected after checking rate-distortion costs of affine merge/skip mode, merge/skip mode, quarter-luma sample MVD precision normal AMVP mode and quarter-luma sample MVD precision affine AMVP mode, then 1/16 luma-sample MV precision and 1-pel MV precision affine inter modes are not checked. Furthermore, affine parameters obtained in quarter-luma-sample MV precision affine inter mode is used as starting search point in 1/16 luma-sample and quarter-luma-sample MV precision affine inter modes.

According to an aspect of the disclosure, two flags, such as denoted by amvr_flag[x0][y0] and amvr_precision_flag [x0][y0], are used to signal AMVR. The array indices x0, y0 specify the location (x0, y0) of the top-left luma sample of the considered coding block relative to the top-left luma sample of the picture. The flag amvr_flag[x0][y0] specifies the resolution of motion vector difference. When amvr_flag [x0][y0] is equal to 0, the resolution of the motion vector difference is ¼ of a luma sample. When amvr_flag[x0][y0] is equal to 1, the resolution of the motion vector difference is further specified by the flag amvr_precision_flag[x0][y0].

When the flag amvr_flag[x0][y0] is not present in the bitstream, it can be inferred in some embodiments. For example, when CuPredMode[x0][y0] is equal to MODE_IBC, the flag amvr_flag[x0][y0] is inferred to be equal to 1; otherwise (CuPredMode[x0][y0] is not equal to MODE_IBC), the flag amvr_flag[x0][y0] is inferred to be equal to 0.

When the flag amvr_precision_flag[x0][y0] is equal to 0, the resolution of the motion vector difference is one integer luma sample if inter_affine_flag[x0][y0] is equal to 0, and the resolution of the motion vector difference is 1/16 of a luma sample if inter_affine_flag[x0][y0] is not equal to 0. When the flag amvr_precision_flag[x0][y0] is equal to 1, the resolution of the motion vector difference is four luma samples if inter_affine_flag[x0][y0] is equal to 0, and the resolution of the motion vector difference is one integer luma sample if inter_affine_flag[x0][y0] is not equal to 0.

When the flag amvr_precision_flag[x0][y0] is not present in the bitstream, it can be inferred to be equal to 0.

According to an aspect of the disclosure, the real motion vector differences (MVD) are obtained based on parsed values from the bitstream (signaled MVDs) and the resolution indicated by the flags, such as amvr_flag[x0][y0] and the amvr_precision_flag[x0][y0].

In an example, when inter_affine_flag[x0][y0] is equal to 0, normal AMVP mode may be used. Then, a variable MvShift (for binary shift bits) is derived according to (Eq. 3) and the motion vector difference variables (in the form of x component and y component) for reference pictures in lists L0 and L1 that are denoted by MvdL0[x0][y0][0], MvdL0 [x0][y0][1], MvdL1[x0][y0][0], MvdL1[x0][y0][1] are modified according to (Eq. 4 to Eq. 7):

$$MvShift=(amvr\_flag[x0][y0]+amvr\_precision\_flag[x0][y0])<<1 \quad (Eq. 3)$$

$$MvdL0[x0][y0][0]=MvdL0[x0][y0][0]<<(MvShift+2) \quad (Eq. 4)$$

$$MvdL0[x0][y0][1]=MvdL0[x0][y0][1]<<(MvShift+2) \quad (Eq. 5)$$

$$MvdL1[x0][y0][0]=MvdL1[x0][y0][0]<<(MvShift+2) \quad (Eq. 6)$$

$$MvdL1[x0][y0][1]=MvdL1[x0][y0][1]<<(MvShift+2) \quad (Eq. 7)$$

Otherwise (inter_affine_flag[x0][y0] is equal to 1), the affine AMVP mode may be used. Then, the variable MvShift is derived and the motion vector difference variables for control points that can be denoted as MvdCpL0[x0][y0][0] [0], MvdCpL0[x0][y0][0][1], MvdCpL0[x0][y0][1][0], MvdCpL0[x0][y0][1][1], MvdCpL0[x0][y0][2][0] and MvdCpL0[x0][y0][2][1] are modified, for example according to (Eq. 8-Eq. 14):

MvShift=amvr_precision_flag[x0][y0] ?

$$(amvr\_precision\_flag[x0][y0]<<1):(-(amvr\_flag[x0][y0]<<1))) \quad (Eq. 8)$$

$$\text{MvdCpL0}[x0][y0][0][0]=\text{MvdCpL0}[x0][y0][0][0]<<\\(\text{MvShift}+2) \quad\quad (Eq. 9)$$

$$\text{MvdCpL1}[x0][y0][0][1]=\text{MvdCpL1}[x0][y0][0][1]<<\\(\text{MvShift}+2) \quad\quad (Eq. 10)$$

$$\text{MvdCpL0}[x0][y0][1][0]=\text{MvdCpL0}[x0][y0][1][0]<<\\(\text{MvShift}+2) \quad\quad (Eq. 11)$$

$$\text{MvdCpL1}[x0][y0][1][1]=\text{MvdCpL1}[x0][y0][1][1]<<\\(\text{MvShift}+2) \quad\quad (Eq. 12)$$

$$\text{MvdCpL0}[x0][y0][2][0]=\text{MvdCpL0}[x0][y0][2][0]<<\\(\text{MvShift}+2) \quad\quad (Eq. 13)$$

$$\text{MvdCpL1}[x0][y0][2][1]=\text{MvdCpL1}[x0][y0][2][1]<<\\(\text{MvShift}+2) \quad\quad (Eq. 14)$$

According to an aspect of the disclosure, a symmetric MVD mode for bi-prediction can be used in video codec. In the symmetric MVD mode, certain motion information, such as reference picture indices of both list-0 and list-1 and MVD of list-1, is not signaled but derived. In some examples, bi-directional optical flow (BDOF) is disabled when symmetric MVD mode is applied.

In some examples, the decoding of the symmetric MVD mode includes several steps, such as three steps in the following description.

In a first step, at slice level, several related variables, such as BiDirPredFlag, RefIdxSymL0 and RefIdxSymL1 are derived. For example, when mvd_l1_zero_flag is 1, BiDirPredFlag is set equal to 0. When mvd_l1_zero_flag is zero, and the nearest reference picture in list-0 and the nearest reference picture in list-1 form a forward and backward pair of reference pictures or a backward and forward pair of reference pictures, BiDirPredFlag is set to 1; otherwise BiDirPredFlag is set to 0.

In a second step, at CU level, a symmetric mode flag indicating whether symmetric mode is used or not is explicitly signaled when the CU is bi-prediction coded and BiDirPredFlag is equal to 1.

When the symmetric mode flag is true, in some embodiments, only mvp_l0_flag, mvp_l1_flag and MVD0 are explicitly signaled. The reference indices for list-0 and list-1 are set equal to the pair of reference pictures, respectively. MVD1 is set equal to (−MVD0). The final motion vectors can be represented as (Eq. 15):

$$\begin{cases}(mvx_0,\ mvy_0)=(mvpx_0+mvdx_0,mvpy_0+mvdy_0)\\(mvx_1,\ mvy_1)=(mvpx_1-mvdx_0,mvpy_1-mvdy_0)\end{cases} \quad (Eq.\ 15)$$

In a third step, when symmetric mode flag is true, BDOF is not applied (e.g., disabled) to the prediction to reduce the complexity in an exmaple.

Figure 12:
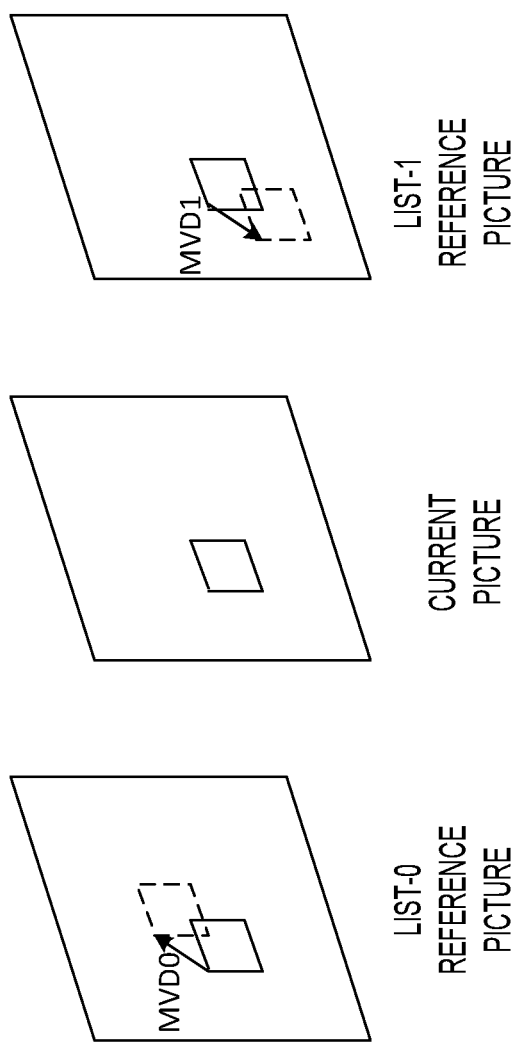
FIG. 12 shows a diagram illustrating symmetric motion vector difference according to some embodiments of the disclosure.

FIG. 12 shows a diagram illustrating symmetric MVD according to some embodiments of the disclosure. FIG. 12 shows a current picture, a list-0 reference picture and a list-1 reference picture that located on opposite sides of the current picture with a same distance (picture order count difference, POC distance) to the current picture. The motion vector difference for list-0 reference picture is represented by MVD0, and the motion vector difference for list-1 reference picture is represented by MVD1. In the FIG. 12 example, MVD0 and MVD1 have equal length, but in opposite direction.

In some embodiments, at the encoder side, symmetric MVD motion estimation starts with initial MV evaluation. A set of initial MV candidates includes the MV obtained from uni-prediction search, the MV obtained from bi-prediction search and the MVs from the AMVP list. Then, the one with the lowest rate-distortion (RD) cost is chosen to be the initial MV for the symmetric MVD motion search.

According to an aspect of the disclosure, some techniques in the present disclosure can share contexts of the AMVR for the normal AMVP mode and the AMVR for the affine AMVP mode when coding the AMVR flag. Thus, the number of contexts may be reduced.

According to another aspect of the disclosure, some techniques in the present disclosure can further optimize precisions used in AMVR for regular AMVP and Affine AMVP.

According to another aspect of the disclosure, some techniques in the present disclosure can handle long term reference pictures (e.g., a background picture for a teleconference) that is stayed in the reference list with difficulty to determine POC distance. For example, in the symmetric motion vector difference (SMVD) mode, when searching for the reference pictures on reference list L0 and reference list L1, some reference pictures may be long term reference pictures, which may cause problem for calculating POC distance.

The proposed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium. In the following, the term block may be interpreted as a prediction block, a coding block, or a coding unit, i.e. CU.

According to an aspect of the disclosure, context modeling techniques can be used on AMVR flag coding to reduce contexts and improve coding efficiency.

AMVR flags (e.g., amvr_flag, amvr_precision_flag) can be used for signaling precisions of motion vectors (or motion vector differences) for various prediction modes, such as regular translational inter mode (e.g., normal AMVP mode), affine AMVP mode, and the like. In a related example, separate sets of contexts (also referred to as context models) are used for different prediction modes. In the related example, a first set of contexts is used for amvr_flag and amvr_precision_flag in the normal AMVP mode, and a second set of contexts is used for amvr_flag and amvr_precision_flag in the affine AMVP mode. In some embodiments of the present disclosure, amvr_flag (1 bin) for normal AMVP mode and affine AMVP mode can share the same context (context model) for the indication whether ¼ sample precision is used. Then, the total number of contexts is reduced. For other bin(s) of signaling AMVR precision (e.g., amvr_precision_flag), the context model(s) for the normal AMVP mode and the affine AMVP mode may be different.

In some embodiments, block size can be used as a condition to switch for different contexts for affine AMVR flag coding.

In an embodiment, block size dependent contexts may be used for affine AMVR flag for each precision. In an example, the number of luma samples in a block is used as the measurement for block size. When the number of luma samples in a block is smaller than or no larger than a threshold, one context is used for affine AMVR flag; when the number of luma samples in the block is no smaller than or larger than the threshold, another context is used for affine AMVR flag.

In another example, the larger value of width and height of the current block is used as a measurement of the block size. When the larger value of width and height is smaller than or no larger than a threshold, one context is used for affine AMVR flag; when the larger value of width and height is no smaller than or larger than the threshold, another context is used for affine AMVR flag.

In another example, the smaller value of width and height of the current block is used as a measurement of the block size. When the smaller value of width and height is smaller than or no larger than a threshold, one context is used for affine AMVR flag; when the smaller value of width and height is no smaller than or larger than a threshold, another context is used for affine AMVR flag.

According to another aspect of the disclosure, precisions of affine AMVR can be modified to optimize coding efficiency.

In an embodiment, ⅛ sample precision (⅛ pel) is used to replace the current quarter sample precision (¼ pdel) in the AMVR coding for affine AMVP mode so that the precision options become (⅛, 1/16, 1) of integer sample.

In another embodiment, a precision lower than 1/16-sample and higher than ¼ sample is used to replace the current 1/16 sample precision in the AMVR for the affine AMVP mode. In an example, ⅛ sample precision (⅛ pel) is used to replace 1/16 sample precision in the AMVR for affine AMVP mode, thus the set of AMVR precisions for the affine AMVP mode is set as {⅛, ¼, 1} of inter sample.

In another embodiment, a precision lower than ¼-sample and higher than 1 sample is used to replace the current 1/16 sample precision in the AMVR for the affine AMVP mode. In an example, ½ sample precision (½ pel) is used to replace 1/16 sample precision (1/16 pel) in the AMVR for affine AMVP mode, thus the set of AMVR precisions for the affine AMVP mode is set as {¼, ½, 1} of inter sample.

In another embodiment, a precision lower than 1-sample is used to replace the 1-sample precision currently used in the AMVR for the affine AMVP mode. In an example, 2-sample precision is used to replace 1-sample precision in the AMVR for the affine AMVP mode. In another example, 4-sample precision is used to replace 1-sample precision in AMVR for the affine AMVP mode.

In some embodiments, size dependent precisions are applied to the AMVR for the normal AMVP mode (referred to as AMVR for simplicity) or applied to the AMVR for the affine AMVP mode (referred to as affine AMVR for simplicity). In some embodiments, the precision used for coding MVDs depends on the block size only. It is noted that, while AMVR is used to illustrate techniques in the following description, the techniques can be used for affine AMVR, or both. It is noted that, in some examples, when block size dependent precisions are used, the AMVR related flags do not need to be signaled at block level, and the precision used for at the block level can be inferred by the related block sizes.

Specifically, in an embodiment, the size dependent precision for AMVR may be as defined according to the following pseudo code (w denotes block width in luma samples, h denotes block height in luma samples):
 If (w==128 && h==128) {2-sample precision is used;}
 Else if (w>=64 && h>=64) {1-sample precision is used;}
 Else if (w>=32 && h>=32) {½-sample precision is used;}
 Else if (w>=16 && h>=16) {¼-sample precision is used;}
 Else ⅛-sample-precision is used;

In another embodiment, the size dependent precision for AMVR may be as described according to following pseudo code (w denotes block width in luma samples, h denotes block height in luma samples):
 If (w==128 && h==128) {1-sample precision is used;}
 Else if (w>=64 && h>=64) {½-sample precision is used;}
 Else if (w>=32 && h>=32) {¼-sample precision is used;}
 Else if (w>=16 && h>=16) {⅛-sample precision is used;}
 Else 1/16-sample-precision is used;

In some embodiments, the precision used for coding MVDs is switchable between a default precision and the block size dependent precision in the above embodiments. It is noted that, while AMVR is used to illustrate techniques in the following description, the techniques can be used for affine AMVR, or both. It is noted that, in some examples, a binary switch (one bin) is signaled to indicate whether to use the default precision or the block size dependent precision, and no other AMVR signaling is needed.

In an embodiment, when the binary switch indicates switching off AMVR, then the default precision is used; when the binary switch indicates switching on AMVR, then the block size dependent precision for AMVR is used. In an example, the block size dependent prevision for AMVR can be defined according to following pseudo code (w denotes block width in luma samples, h denotes block height in luma samples):
 If (w==128 && h==128) {2-sample precision is used;}
 Else if (w>=64 && h>=64) {1-sample precision is used;}
 Else if (w>=32 && h>=32) {½-sample precision is used;}
 Else if (w>=16 && h>=16) {¼-sample precision is used;}
 Else {⅛-sample-precision is used;}

In another example, the block size dependent precision for AMVR may be defined according to the following pseudo code (let w denotes block width in luma samples, h denotes block height in luma samples):
 If (w==128 && h==128) {1-sample precision is used;}
 Else if (w>=64 && h>=64) {½-sample precision is used;}
 Else if (w>=32 && h>=32) {¼-sample precision is used;}
 Else if (w>=16 && h>=16) {⅛-sample precision is used;}
 Else 1/16-sample-precision is used;

In some embodiments, the precision used for coding MVDs is switchable between a regular AMVR (including a set of fixed precisions) and the block size dependent precision. It is noted that, while AMVR is used to illustrate techniques in the following description, the techniques can be used for affine AMVR, or both. It is noted that, in some examples, a binary switch (one bin) is signaled to indicate whether to use the regular AMVR precision or the block size dependent precision.

In an embodiment, when the binary switch indicates switching off block size dependent precision, then the default AMVR (that selects a precision from a fixed set of precisions based on signaled index) is used; when the binary switch indicates switching on the block size dependent precision, then the block size dependent precision for AMVR is used.

Specifically, in an embodiment, the block size dependent prevision for AMVR can be defined according to following pseudo code (w denotes block width in luma samples, h denotes block height in luma samples):

If (w==128 && h==128) {2-sample precision is used;}
Else if (w>=64 && h>=64) {1-sample precision is used;}
Else if (w>=32 && h>=32) {½-sample precision is used;}
Else if (w>=16 && h>=16) {¼-sample precision is used;}
Else ⅛-sample-precision is used;

In another embodiment, the block size dependent prevision for AMVR can be defined according to following pseudo code (w denotes block width in luma samples, h denotes block height in luma samples):

If (w==128 && h==128) {1-sample precision is used;}
Else if (w>=64 && h>=64) {½-sample precision is used;}
Else if (w>=32 && h>=32) {¼-sample precision is used;}
Else if (w>=16 && h>=16) {⅛-sample precision is used;}
Else ¹⁄₁₆-sample-precision is used;

It is noted that the switch decision between the block size dependent precision and another option can be decided at the block level as described above and can be decided at a higher level than the block level.

In an embodiment, at CTU level, the switch decision between the block size dependent precision and another option is made and applicable to all blocks inside the CTU. The decision can be signaled using a flag or inferred using derivation, based on other information, such as the precision used from spatial or temporal neighboring CTUs.

In another embodiment, at slice/tile/tile group/picture level, the switch decision between the block size dependent precision and another option is made and applicable to all blocks inside the level. The decision can be signaled using a flag at the level or inferred using derivation, based on other information, such as the precision used from one or more previously coded slice/tile/tile group/picture.

In some embodiments, MV precision rounding is applied according to AMVR precision on MVD only. For example, MV of motion vector predictors for either regular inter mode or affine CPMVs do not have rounding applied regardless of precision settings use in AMVR.

In an embodiment, for the affine AMVR, the adaptive precision for MVD is applied on the second control point, and the third control point (if 6-parameter affine is used); and the MVD for the first control point, is coded with fixed precision, such as ¼-sample, ⅛-sample, or ¹⁄₁₆-sample.

Another aspect of the disclosure provides techniques for handing long term reference picture (LTRP) in the coding of SMVD.

In an embodiment, when searching the reference picture lists to find a pair of reference pictures to be used in SMVD coding for the current block, if any reference picture is marked as long-term reference picture (LTRP), that reference picture is skipped without POC checking or POC distance checking against the current picture. Thus, long-term reference picture may not be used if current block is coded in SMVD mode.

In another embodiment, when searching the reference picture lists to find a pair of reference pictures to be used in SMVD coding for the current block, if any reference picture is marked as long-term reference picture (LTRP), that reference picture's will be assigned a default POC value (this is determined relative to the current picture's POC) when checking against the current picture. For example, if current picture's POC is N, and the LTRP's original POC is smaller than N, then the default POC when involved in SMVD calculation can be assigned with N-M (M being an integer such as 1, 2, . . . ). Similarly, if the LTRP's original POC is larger than N, then the default POC when involved in SMVD calculation can be assigned N+M (M being an integer such as 1, 2, . . . ).

In another embodiment, when searching the reference picture lists to find a pair of reference pictures to be used in SMVD coding for the current block, if any reference picture is associated with weighted prediction on, the picture is skipped without POC checking or POC distance checking against the current picture. Then, reference picture with explicit weighted prediction may not be used if current block is coded in SMVD mode. Alternatively, a slice level flag is signaled to indicate whether a picture associated with explicit weighted prediction may be considered during the decoding process for symmetric motion vector difference (SMVD) reference indices. If yes, pictures associated with explicit weighted prediction are considered before other pictures during the decoding process for symmetric motion vector difference reference indices. Otherwise, pictures associated with explicit weighted prediction are not considered during the decoding process.

According to another aspect of the disclosure, SMVD coding techniques can be applied on affine motion compensation. In some embodiments of present disclosure, in the affine motion compensation, a subset of the control points have MVD coded using the SMVD coding techniques and other control points may have MVD coded using other MVD coding technique, such as regular MVD coding technique.

In an embodiment, the first control point, denoted as CP0, may be coded using regular MVD coding technique, and the rest of control points (CP1 in 4-parameter affine mode, CP1 and CP2 for 6-parameter affine mode) may be coded using SMVD coding techniques.

In another embodiment, only the first control point, denoted as CP0), may be coded using SMVD coding technique, and the rest of control points (CP1 in 4-parameter affine mode, CP1 and CP2 for 6-parameter affine mode) may be coded using regular MVD coding technique.

Figure 13:
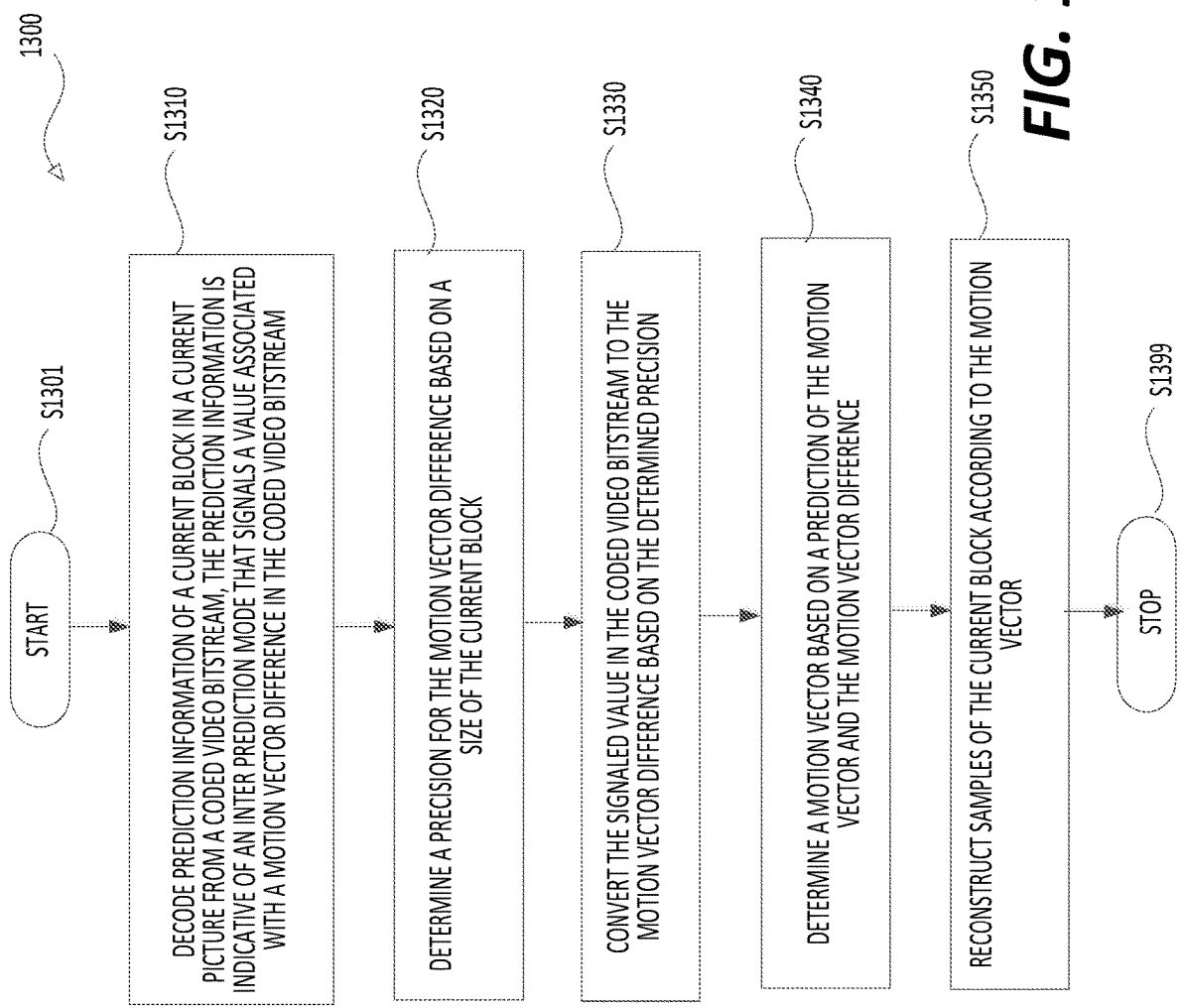
FIG. 13 shows a flow chart outlining a process example according to some embodiments of the disclosure.

FIG. 13 shows a flow chart outlining a process (1300) according to an embodiment of the disclosure. The process (1300) can be used in the reconstruction of a block, so to generate a prediction block for the block under reconstruction. In various embodiments, the process (1300) are executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the video encoder (503), and the like. In some embodiments, the process (1300) is implemented in software instructions, thus when the processing circuitry executes the software instructions, the processing circuitry performs the process (1300). The process starts at (S1301) and proceeds to (S1310).

At (S1310), prediction information of a current block in a current picture is decoded from a coded video bitstream. The prediction information is indicative of an inter prediction mode that signals a value associated with a motion vector difference in the coded video bitstream.

At (S1320), a precision for the motion vector difference is determined based on a size of the current block.

In some embodiments, a flag that is indicative of the precision for the motion vector difference used in an affine mode is decoded according to a context that is selected based on the size of the current block. For example, the block size can be used as a condition to select the contexts for affine AMVR flag coding. In an embodiment, the context is selected based on a comparison of a number of luma samples in the current block to a first threshold. In another embodiment, the context is selected based on a comparison of a larger value of a width and a height of the current block to a second threshold. In another embodiment, the context is selected based on a comparison of a smaller value of the width and the height of the current block to a third threshold.

In some embodiments, a flag for indicating whether a specific precision is used can be decoded based on a context that is shared in an affine mode and a non-affine mode. For example, the normal AMVP mode and the affine AMVP mode can share the same context for the bin indicating whether ¼ sample precision is used.

In some embodiments, the precision for the motion vector difference is determined based on a predetermined relationship that associates sizes with precisions, such as the relationships in the pseudo codes of above description.

In some embodiments, a switch bin that indicates the precision for the motion vector difference is a block size dependent precision is decoded. The switch bin is used to switch between the block size dependent precision and at least one of a default precision and a selected precision that is selected from a set of fixed precisions based on an index.

In some embodiments, for example in affine AMVP mode, the precision is applied to a subset of control points, such as to a first motion vector difference of a first control point. Another precision, such as a fixed precision can be applied to a second motion vector difference of a second control point.

At (S1330), the signaled value in the coded video bitstream is converted to the motion vector difference based on the determined precision.

At (S1340), a motion vector is determined based on a prediction of the motion vector and the motion vector difference.

At (S1350), samples of the current block are reconstructed according to the motion vector. Then, the process proceeds to (S1399) and terminates.

Figure 14:
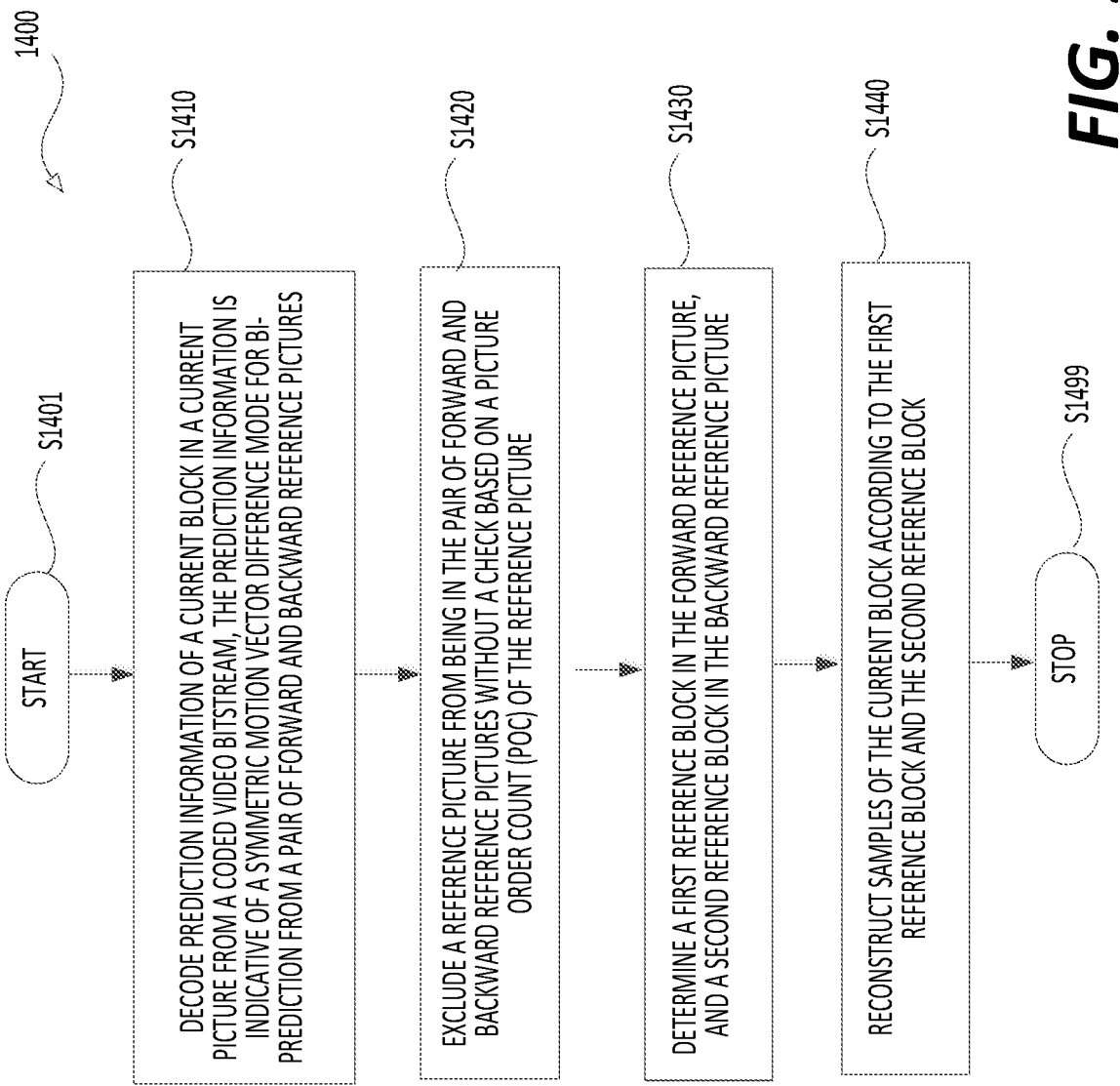
FIG. 14 shows another flow chart outlining a process example according to some embodiments of the disclosure.

FIG. 14 shows a flow chart outlining a process (1400) according to an embodiment of the disclosure. The process (1400) can be used in the reconstruction of a block, so to generate a prediction block for the block under reconstruction. In various embodiments, the process (1400) are executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the video encoder (503), and the like. In some embodiments, the process (1400) is implemented in software instructions, thus when the processing circuitry executes the software instructions, the processing circuitry performs the process (1400). The process starts at (S1401) and proceeds to (S1410).

At (S1410), prediction information of a current block in a current picture is decoded from a coded video bitstream. The prediction information is indicative of a symmetric motion vector difference mode for bi-prediction from a pair of forward and backward reference pictures.

At (S1420), a reference picture is excluded from being in the pair of forward and backward reference pictures without a check based on a picture order count (POC) of the reference picture.

In some embodiments, when searching the pair of forward and backward reference pictures, the reference picture is skipped in in response to a detection of a long term reference picture (LTRP) mark associated with the reference picture. Thus, POC or POC distance of the reference picture is not checked.

In some embodiments, the reference picture is assigned a calculated picture order count with a default POC distance to the current picture, in response to a detection of a long term reference picture (LTRP) mark associated with the reference picture. For example, if current picture's POC is N, M is a default POC distance. (N−M) or (N+M) can be assigned to the reference picture associated with the LTRP mark. Thus, the original (real) POC and the POC distance of the reference picture are not checked.

In some embodiments, the reference picture is skipped in a searching of the pair of forward and backward reference pictures in response to a detection that the reference picture is associated with a weighted prediction. Generally, the weighted prediction uses unequal weights for the reference pictures and can be excluded from the symmetric MVD mode.

At (S1430), a first reference block for the current block in the forward reference picture, and a second reference block for the current block in the backward reference picture are determined, for example based on motion vector and symmetric MVD.

At (S1440), samples of the current block are reconstructed according to the first reference block and the second reference block. For example, a sample can be reconstructed based on an average of corresponding reference samples in the first reference block and the second reference block. Then, the process proceeds to (S1499) and terminates.

The techniques described above, can be implemented as computer software using computer-readable instructions and physically stored in one or more computer-readable media. For example, FIG. 15 shows a computer system (1500) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 15:
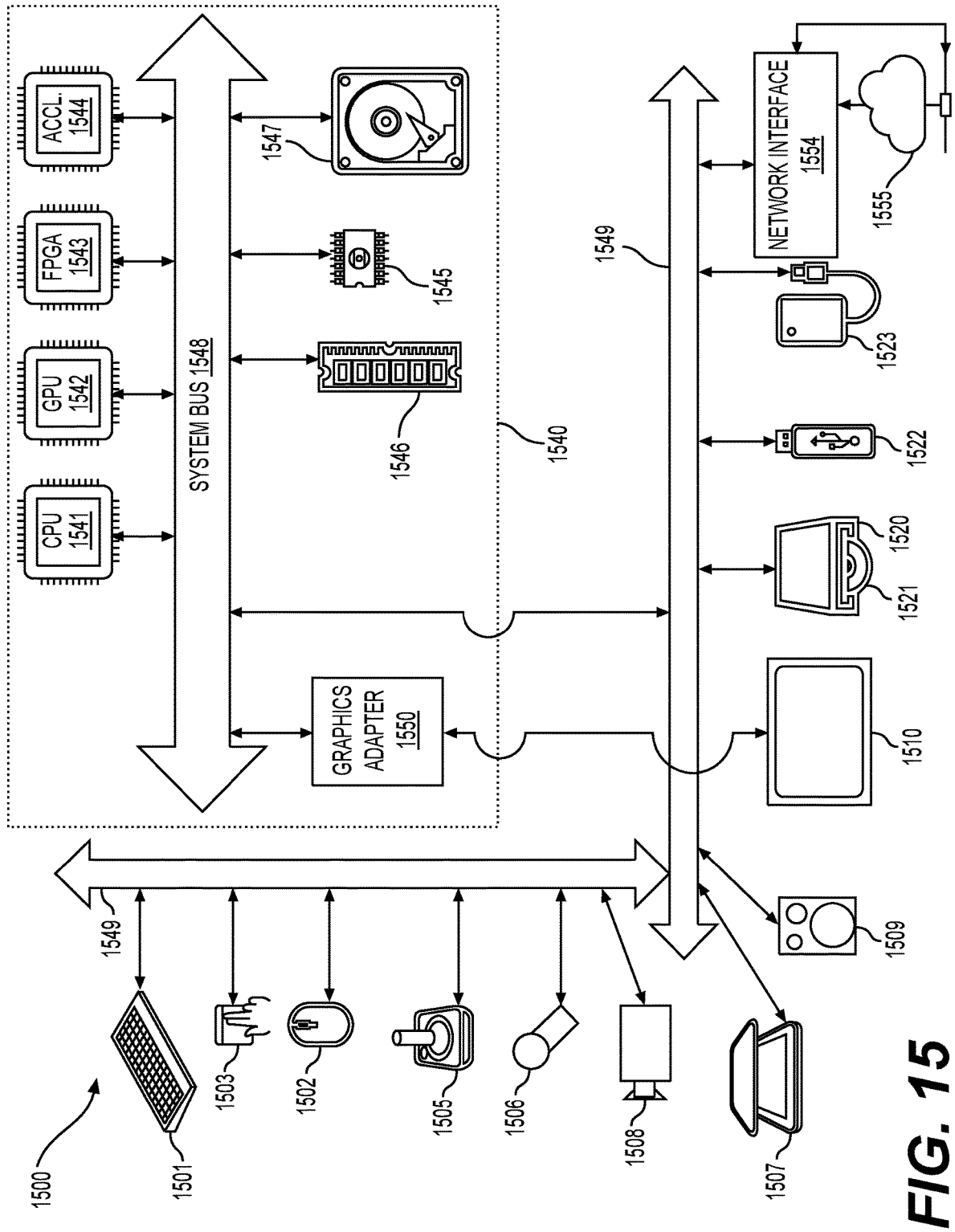
FIG. 15 is a schematic illustration of a computer system in accordance with an embodiment.

The components shown in FIG. 15 for computer system (1500) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1500).

Computer system (1500) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1501), mouse (1502), trackpad (1503), touch screen (1510), data-glove (not shown), joystick (1505), microphone (1506), scanner (1507), camera (1508).

Computer system (1500) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1510), data-glove (not shown), or joystick (1505), but there can also be tactile feedback devices that do not serve as input devices), audio output devices (such as: speakers (1509), headphones (not depicted)), visual output devices (such as screens (1510) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1500) can also include human accessible storage devices and their associated media such as optical media including CD/DVD ROM/RW (1520) with CD/DVD or the like media (1521), thumb-drive (1522), removable hard drive or solid state drive (1523), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1500) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1549) (such as, for example USB ports of the computer system (1500)); others are commonly integrated into the core of the computer system (1500) by attachment to a system bus as described below (for example Ethernet interface into a PC computer system or cellular network interface into a smartphone computer system). Using any of these networks, computer system (1500) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1540) of the computer system (1500).

The core (1540) can include one or more Central Processing Units (CPU) (1541), Graphics Processing Units (GPU) (1542), specialized programmable processing units in the form of Field Programmable Gate Areas (FPGA) (1543), hardware accelerators for certain tasks (1544), and so forth. These devices, along with Read-only memory (ROM) (1545), Random-access memory (1546), internal mass storage such as internal non-user accessible hard drives, SSDs, and the like (1547), may be connected through a system bus (1548). In some computer systems, the system bus (1548) can be accessible in the form of one or more physical plugs to enable extensions by additional CPUs, GPU, and the like. The peripheral devices can be attached either directly to the core's system bus (1548), or through a peripheral bus (1549). Architectures for a peripheral bus include PCI, USB, and the like.

CPUs (1541), GPUs (1542), FPGAs (1543), and accelerators (1544) can execute certain instructions that, in combination, can make up the aforementioned computer code. That computer code can be stored in ROM (1545) or RAM (1546). Transitional data can be also be stored in RAM (1546), whereas permanent data can be stored for example, in the internal mass storage (1547). Fast storage and retrieve to any of the memory devices can be enabled through the use of cache memory, that can be closely associated with one or more CPU (1541), GPU (1542), mass storage (1547), ROM (1545), RAM (1546), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1500), and specifically the core (1540) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1540) that are of non-transitory nature, such as core-internal mass storage (1547) or ROM (1545). The software implementing various embodiments of the present disclosure can be stored in such devices and executed by core (1540). A computer-readable medium can include one or more memory devices or chips, according to particular needs. The software can cause the core (1540) and specifically the processors therein (including CPU, GPU, FPGA, and the like) to execute particular processes or particular parts of particular processes described herein, including defining data structures stored in RAM (1546) and modifying such data structures according to the processes defined by the software. In addition or as an alternative, the computer system can provide functionality as a result of logic hardwired or otherwise embodied in a circuit (for example: accelerator (1544)), which can operate in place of or together with software to execute particular processes or particular parts of particular processes described herein.

Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method for video decoding in a processor, comprising:
    decoding, by processing circuitry, prediction information of a current block in a current picture from a coded video bitstream, the prediction information being indicative of an inter prediction mode that signals a value associated with a motion vector difference in the coded video bitstream;
    setting, by the processing circuitry, a precision to be used to convert the signaled value in the coded bitstream to the motion vector difference, based on a size of the current block; and
    converting, by the processing circuitry, the signaled value in the coded video bitstream to the motion vector difference based on the set precision so that the motion vector difference has the set precision;
    determining, by the processing circuitry, a motion vector based on a prediction of the motion vector and the motion vector difference: and
    reconstructing, by the processing circuitry, at least a sample of the current block according to the determined motion vector.

2. The method of claim 1, further comprising:
    decoding, by the processing circuitry, at least a flag indicative of the precision for the motion vector difference used in an affine mode according to a context that is selected based on the size of the current block.

3. The method of claim 2, further comprising at least one of:
    selecting the context based on a comparison of a number of luma samples in the current block to a first threshold;
    selecting the context based on a comparison of a larger value of a width and a height of the current block to a second threshold; and
    selecting the context based on a comparison of a smaller value of the width and the height of the current block to a third threshold.

4. The method of claim 1, further comprising:
    decoding, by the processing circuitry, a flag indicating whether a specific precision is used based on a context that is shared in an affine mode and a non-affine mode.

5. The method of claim 1, further comprising:
    determining, by the processing circuitry, the precision for the motion vector difference based on a predetermined relationship that associates sizes with precisions.

6. The method of claim 1, further comprising:
    decoding a switch bin, which indicates that the precision for the motion vector difference is a block size dependent precision.

7. The method of claim 6, wherein the switch bin is used to switch between the block size dependent precision and at least one of:
    a default precision; and
    a selected precision that is selected from a set of fixed precisions based on an index.

8. The method of claim 1, further comprising:
    applying the precision to a first motion vector difference of a first control point in an affine mode; and
    applying a fixed precision to a second motion vector difference of a second control point.

9. An apparatus for video decoding, comprising:
    processing circuitry configured to:
        decode prediction information of a current block in a current picture from a coded video bitstream, the prediction information being indicative of an inter prediction mode that signals a value associated with a motion vector difference in the coded video bitstream;
        set a precision to be used to convert the signaled value in the coded bitstream to the motion vector difference, based on a size of the current block; and
        convert the signaled value in the coded video bitstream to the motion vector difference based on the set precision so that the motion vector difference has the set precision;
        determine a motion vector based on a prediction of the motion vector and the motion vector difference; and
        reconstruct at least a sample of the current block according to the determined motion vector.

10. The apparatus of claim 9, wherein the processing circuitry is further configured to:
  decode at least a flag indicative of the precision for the motion vector difference used in an affine mode according to a context that is selected based on the size of the current block.

11. The apparatus of claim 10, wherein the processing circuitry is further configured to select the context based on at least one of:
  a comparison of a number of luma samples in the current block to a first threshold;
  a comparison of a larger value of a width and a height of the current block to a second threshold; and
  a comparison of a smaller value of the width and the height of the current block to a third threshold.

12. The apparatus of claim 9, wherein the processing circuitry is further configured to:
  decode a flag for indicating whether a specific precision is used based on a context that is shared in an affine mode and a non-affine mode.

13. The apparatus of claim 9, wherein the processing circuitry is further configured to:
  determine the precision for the motion vector difference based on a predetermined relationship that associates sizes with precisions.

14. The apparatus of claim 9, wherein the processing circuitry is further configured to:
  decode a switch bin, which indicates that the precision for the motion vector difference is a block size dependent precision.

15. The apparatus of claim 14, wherein the switch is used to switch between the block size dependent precision and at least one of:
  a default precision; and
  a selected precision that is selected from a set of fixed precisions based on an index.

16. The apparatus of claim 9, wherein the processing circuitry is further configured to:
  apply the precision to a first motion vector difference of a first control point in an affine mode; and
  apply a fixed precision to a second motion vector difference of a second control point.

17. A method for video decoding in a processor, comprising:
  decoding prediction information of a current block in a current picture from a coded video bitstream, the prediction information being indicative of an inter prediction mode that signals a value associated with a motion vector difference in the coded video bitstream;
  decoding a switch bin, which indicates that a precision for the motion vector difference is a block size dependent precision;
  determining the precision for the motion vector difference based on a size of the current block;
  converting the signaled value in the coded video bitstream to the motion vector difference based on the determined precision;
  determining the motion vector based on a prediction of the motion vector and the motion vector difference; and
  reconstructing at least a sample of the current block according to the motion vector.

* * * * *